United States Patent [19]

Early et al.

[11] Patent Number: 5,998,896

[45] Date of Patent: *Dec. 7, 1999

[54] ELECTRIC MOTOR HAVING FRAME ADAPTABLE FOR ENCLOSED AND OPEN MOTOR COOLING

[75] Inventors: John Early; Thomas S. Evon; Barron D. Grant, all of Gainesville, Ga.; Michael J. Melfi, Euclid, Ohio; Patricia L. Smith; Daniel J. Stelzner, both of Duluth, Ga.

[73] Assignee: Reliance Electric Industrial Company, Cleveland, Ohio

[*] Notice: This patent issued on a continued prosecution application filed under 37 CFR 1.53(d), and is subject to the twenty year patent term provisions of 35 U.S.C. 154(a)(2).

[21] Appl. No.: 08/974,176

[22] Filed: Nov. 19, 1997

[51] Int. Cl.[6] .............................. H02K 5/00; H02K 5/20; H02K 5/22

[52] U.S. Cl. ................................ 310/89; 310/58; 310/63; 310/259

[58] Field of Search .................................. 310/89, 58, 63, 310/59, 52, 62, 216, 259

[56] References Cited

U.S. PATENT DOCUMENTS

| | | | |
|---|---|---|---|
| 1,599,065 | 9/1926 | Rudenberg | 310/58 |
| 3,531,668 | 9/1970 | Cathey | 310/58 |
| 3,819,965 | 6/1974 | Schoendube | 310/58 |
| 4,399,382 | 8/1983 | Volkrodt | 310/216 |
| 5,192,888 | 3/1993 | Fleer | 310/71 |

FOREIGN PATENT DOCUMENTS

| | | | |
|---|---|---|---|
| 6-153448 | 5/1994 | Japan | 310/89 |

OTHER PUBLICATIONS

"RPM AC Motors", Totally Enclosed Air Over, Reliance Electric Company, Cleveland, Ohio, Nov. 18, 1997.

"RPM AC Motors", Forced Ventilated, Reliance Electric Company, Cleveland, Ohio, Nov. 18, 1997.

*Primary Examiner*—Nestor Ramirez
*Assistant Examiner*—Karl I. Tamai
*Attorney, Agent, or Firm*—Craig N. Killen; John M. Miller; John J. Horn

[57] ABSTRACT

A frame for the housing of an electric motor having a top cavity that extends axially along the upper interior portion of the frame and beneath the top wall of the frame. The top cavity functions as a conduit box through which access is provided to the electrical leads of the motor, thus eliminating the need for a separate conduit box attached to the exterior of the housing. The frame also includes an axially extending, corner channel along each of its four corners. The frame is adaptable for both closed and open housing cooling arrangements.

6 Claims, 6 Drawing Sheets

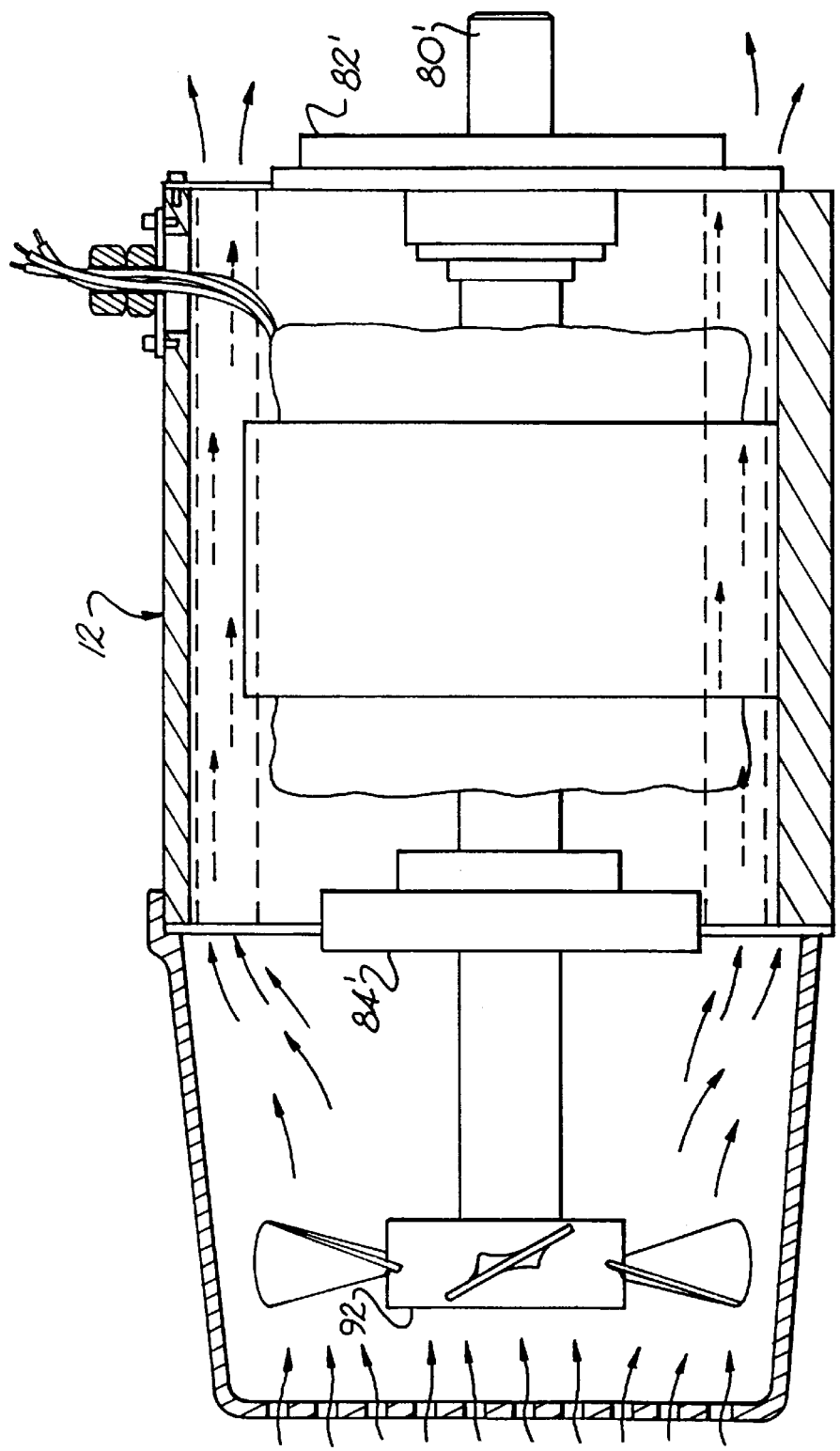

ELECTRIC MOTOR HAVING FRAME ADAPTABLE FOR ENCLOSED AND OPEN MOTOR COOLING

BACKGROUND OF THE INVENTION

The present invention relates generally to the art of electric motors. More particularly, the invention relates to an improved frame for the housing of an electric motor.

The frame of an electric motor houses the stator and the rotor. In a conventional frame, a separate conduit box is typically located on the exterior of the frame for providing access to the motor's various electrical leads. The separate conduit box adds both cost and volume to the motor.

Operation of an electric motor generates heat that must be removed. Conventional motors often provide cooling by forcing air through or over the motor. At least two configurations for such forced air cooling are known. One cooling configuration is frequently used in motors in which the housing interior is closed off from the ambient air. The other cooling configuration is often used in motors in which the housing interior is open to ambient air.

In a typical closed motor configuration, the frame of the motor housing is provided with a plurality of air channels. Each air channel extends axially along the frame. A cowling having vent openings defined therein is mounted to one end of the frame. A shaft-mounted fan, or separately-powered in-line blower, is located in the cowling to force air through the air channels. Heat is dissipated to the forced air by conduction through the frame.

In the open cooling configuration, a mounting bracket may be attached to the end of the motor frame. The bracket is configured to support a blower fan powered by a separate motor. Operation of the fan forces air into the frame of the motor housing. A small gap exists between the rotor and the stator, and some cooling air can pass through this gap to circulate around the opposite end of the stator/rotor assembly, i.e., the end that is farther from the fan. In addition, the rotor may be provided with elongated passages extending axially therethrough to permit transfer of some forced air from the end of the rotor that is nearer to the fan, to the end of the rotor that is farther from the fan. Air may also be forced through axial channels in the frame since they are internal to the motor in this cooling arrangement.

SUMMARY OF THE INVENTION

The present invention recognizes and addresses the foregoing disadvantages, and others, of prior art constructions and methods. Accordingly, it is an object of the present invention to provide an improved frame for housing the stator/rotor of an electric motor.

It is a further object of the present invention to provide an improved frame that is adaptable for both open and closed housings for electric motors.

It is a further object of the present invention to provide an improved frame that eliminates the need for a separate conduit box attached to the exterior of the electric motor housing.

It is another object of the present invention to provide an improved frame that facilitates cooling to both ends of the housing interior when used in an open cooling configuration.

It is also an object of the present invention to provide an improved frame that facilitates cooling to both ends of the housing interior when used in an open cooling configuration, while reducing the volume occupied by the motor and the cost of producing same.

Objects of the present invention are achieved by a frame for a motor housing defining a top cavity that extends axially along the upper interior portion of the frame and beneath the top wall of the frame. The top cavity functions as a conduit box providing access to the electrical leads of the motor, thus eliminating the need for a separate conduit box attached to the exterior of the housing. Preferably, the frame also includes a plurality of axially extending cooling channels. The cooling channels may be located in the respective corners of the frame.

The frame is adaptable for both closed and open housing cooling arrangements. In open housing embodiments, the ends of the top cavity may be sealed by cover plates. A fan is preferably mounted in communication with an opening defined through the center portion of the top wall of the frame. Operation of the fan forces air into and through the top cavity and to the main cavity, thus providing adequate cooling air over the motor's winding surfaces located at both ends of the motor. Moreover, a notch in the form of a cut out portion may be provided in each end of the lower corner channels so that air arriving through the top cavity can exhaust.

Because the same frame can be used for both open housing and closed housing cooling arrangements, the parts inventory for building such housings is reduced. Moreover, the need to provide an additional conduit box and mounting can be eliminated from both configurations. Also, the top cavity can be used to mount a variable voltage or variable frequency controller, or electronic diagnostics. In addition, a motor constructed with a frame of the present invention can be provided with a round stator core that permits the motor to be machine wound.

Because air is forced across both coilheads instead of only one as in many conventional forced ventilated cooling configurations, the frame of the present invention may provide superior cooling in such applications.

Other objects and aspects of the present invention are provided by various combinations and subcombinations of the disclosed elements, which are discussed in greater detail below.

BRIEF DESCRIPTION OF THE DRAWINGS

A full and enabling disclosure of the present invention, including the best mode thereof, to one of ordinary skill in the art, is set forth more particularly in the remainder of the specification, including reference to the accompanying drawings, in which:

FIG. 4A is a view similar to FIG. 4 showing an alternative shaft-mounted fan arrangement.

Figure 1:
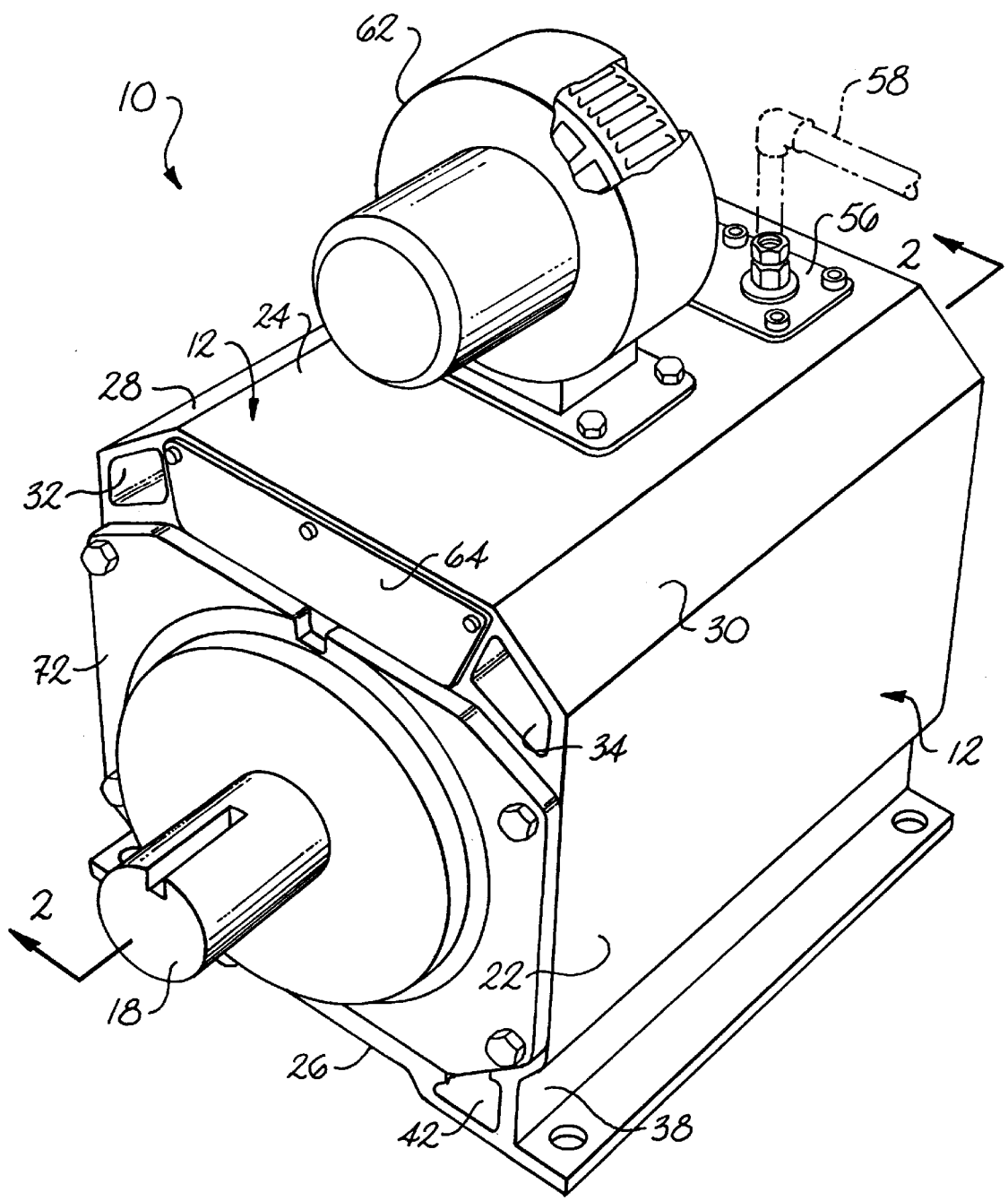
FIG. 1 is a perspective view of a presently preferred embodiment of the open housing form of the invention with an electrical lead conduit shown in phantom.

Repeat use of reference characters in the present specification and drawings is intended to represent same or analogous features or elements of the invention.

DETAILED DESCRIPTION OF PREFERRED EMBODIMENTS

It is to be understood by one of ordinary skill in the art that the present discussion is a description of exemplary embodiments only, and is not intended as limiting the broader aspects of the present invention, which broader aspects are embodied in the exemplary constructions. The same numbers are used throughout the drawings to reference the same or corresponding features common to different embodiments. Moreover, features that are part of one embodiment can be combined with features of another embodiment to yield a yet further embodiment.

In accordance with the present invention, an improved frame is provided as the main body portion of the housing for an electric motor. The frame houses the compartment that contains the stator and rotor of the motor and is formed as a generally cylindrical member that defines an interior surface and an exterior surface. Advantageously, preferred embodiments of the motor frame are adaptable for use in either closed housing or open housing cooling arrangements.

Figure 2:
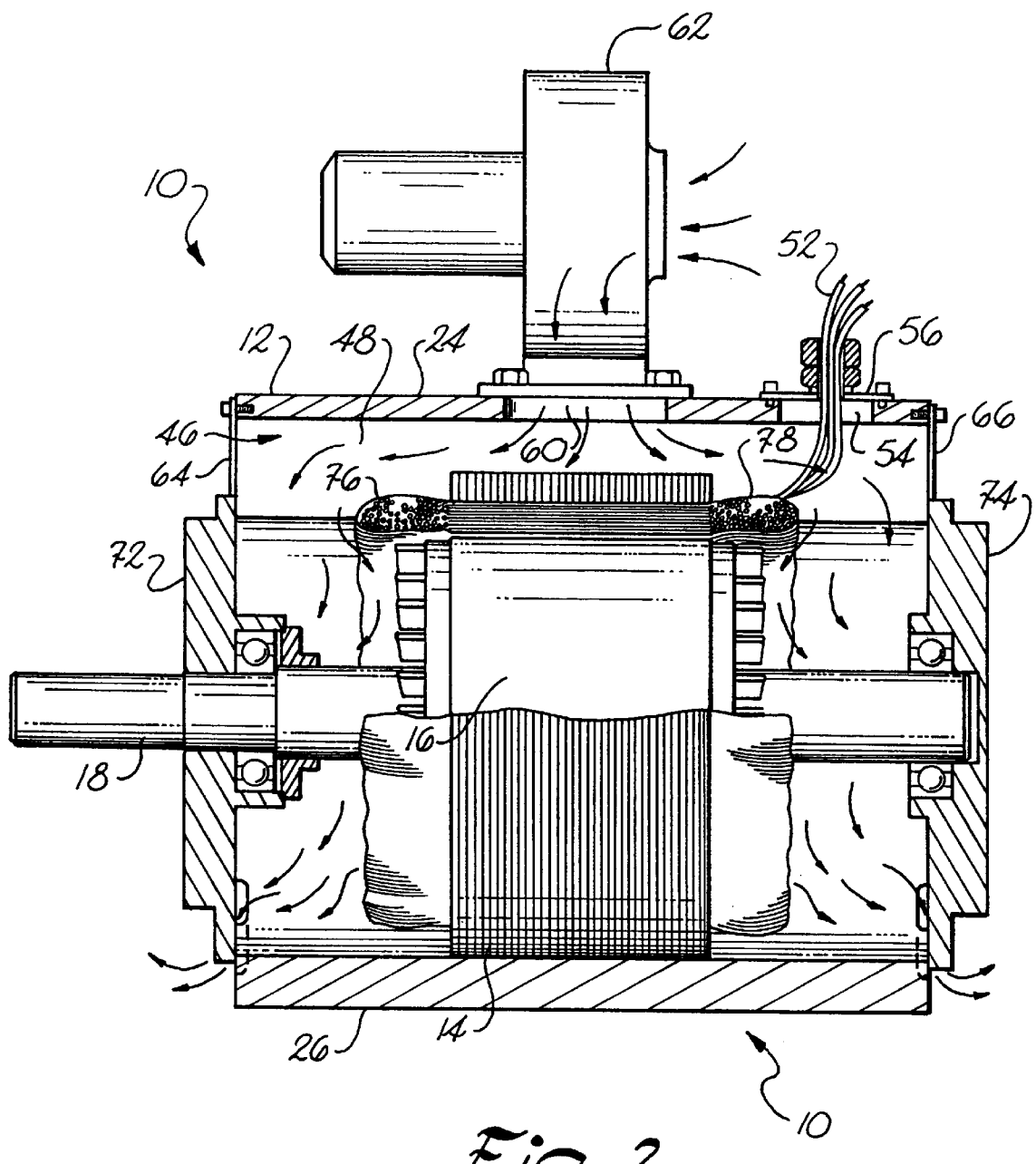
FIG. 2 is a cross-sectional view taken along line 2—2 in FIG. 1.

For example, FIGS. 1 and 2 illustrate an electric motor (generally indicated at 10) having an improved frame 12 arranged for open housing cooling. As shown in FIG. 2, frame 12 houses a stator 14 and a rotor 16 for the motor. A rotating magnetic field produced in stator 14 is "followed" by rotor 16 during motor operation, producing a concomitant rotation of shaft 18. Although motor 10 is constructed as an induction motor in the illustrated embodiment, it should be appreciated that the teachings of the present invention are applicable to other types of electromechanical machines.

Figure 3:
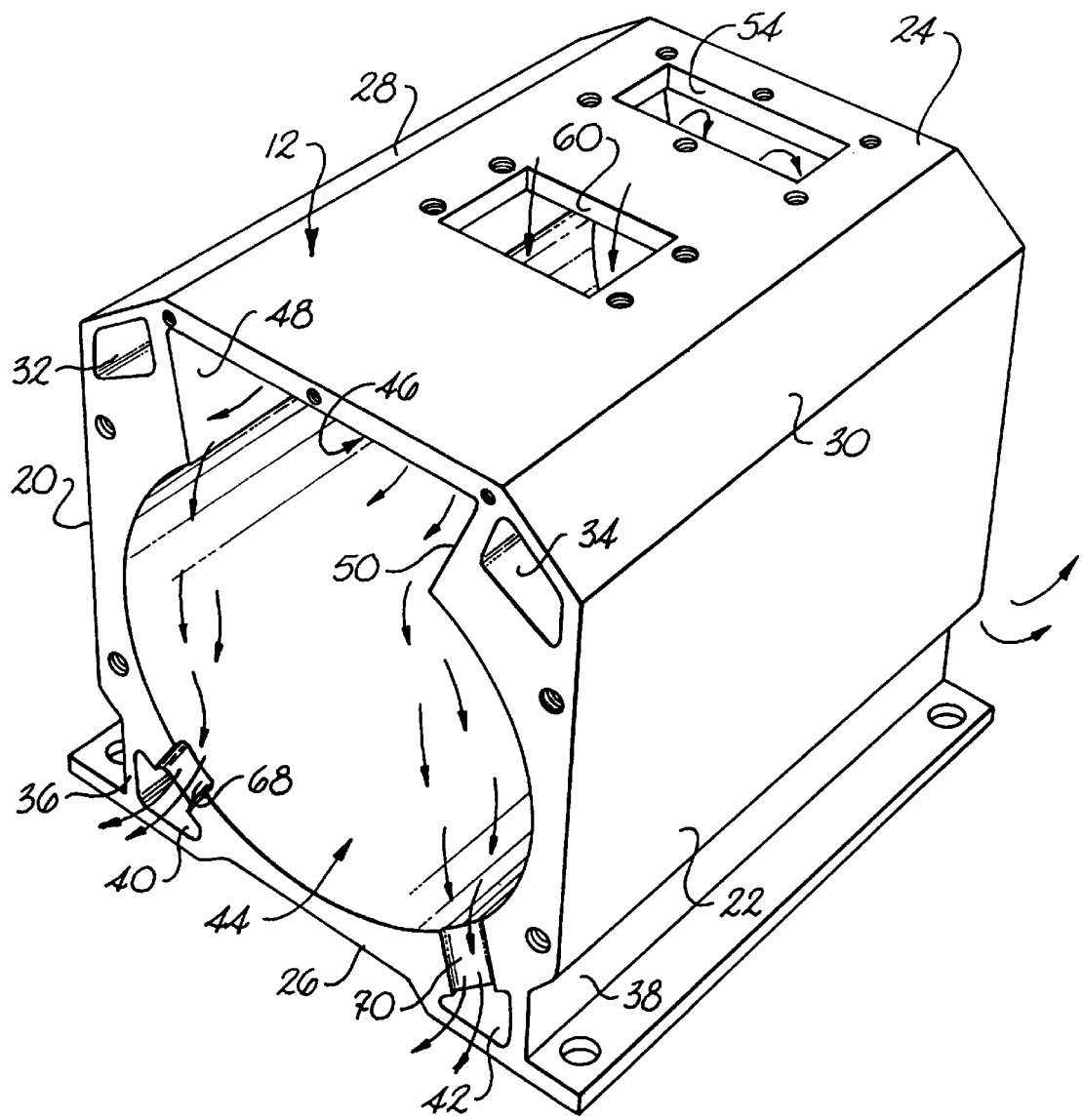
FIG. 3 is a perspective view of a presently preferred embodiment of the motor frame of the invention showing cooling air flow in an open housing arrangement.

Referring now also to FIG. 3, frame 12 includes a pair of opposed side walls 20 and 22 extending generally between a top wall 24 and a bottom wall 26. Angled corner portions 28 and 30 connect the respective side walls 20 and 22 to top wall 24, as shown. Thus, each corner portion connects one opposite peripheral region of top wall 24 with an upper region of one of side walls 20 or 22. A pair of elongated upper corner channels 32 and 34 are defined through respective corner portions 28 and 30. Corner channels 28 and 30 extend along the entire axial length of frame 12 to provide through-passages for forced cooling air as will be described below.

In addition, a pair of lower corner portions 36 and 38 connect one opposite peripheral region of bottom wall 26 with a respective lower region of side walls 20 and 22. At these locations, frame 12 defines respective elongated lower corner channels 40 and 42 extending axially along its entire length. Like channels 32 and 34, channels 40 and 42 provide passages through which air may flow for cooling the electric motor during operation. As shown, frame 12 may preferably define integral "feet" at lower corner portions 36 and 38.

As shown in FIG. 3, frame 12 defines a main cavity 44 generally in the shape of a cylinder having a circular transverse cross-sectional shape. Principally, the interior surfaces of side walls 20 and 22, and bottom wall 26, combine to define main cavity 44.

In accordance with the present invention, frame 12 further defines an elongate top cavity 46. Top cavity 46 is preferably defined beneath the interior surface of top wall 24, between diverging side walls 48 and 50 defined in the interior of frame 12. Top cavity 46 also communicates with the upper region of main cavity 44 and extends axially along the length of frame 12.

As shown in FIG. 2, top cavity 46 provides space for installing the electrical leads 52 to be connected to the motor 10. In this regard, an access opening 54 can be defined in top wall 24 to provide access to various electrical wires located in the interior of frame 12. Such wires may include, for example, power leads to stator 14 as well as leads to various sensors and the like. In so doing, frame 12 eliminates the need for a separate conduit box attached to the outside of the motor housing. A closure plate 56 can be installed to close access opening 54 after lead connection has been effected. Closure plate 56 may itself be adapted with an appropriate fitting or the like for receipt of an electrical conduit 58, which carries the electrical leads away from motor 10.

The frame of the present invention lends itself to incorporation into both open and closed housing cooling arrangements. In the open cooling arrangement, as shown in FIGS. 1–3, the interior compartment of the motor housing remains in communication with, and thus exposed to, the ambient atmosphere. For use in this arrangement, frame 12 is preferably further outfitted in several respects.

For example, a fan opening 60 may be defined in top wall 24 in order to enable a cooling fan 62 to blow air into the housing interior. Fan opening 60 may be desirably disposed in a generally central location with respect to main cavity 44 of the frame 12, as has been done in some prior art arrangements. In addition, cover plates 64 and 66 are preferably attached to the respective end surfaces of frame 12 to close off top cavity 46.

As shown in FIG. 3, cut out portions 68 and 70 are preferably machined through each end surface of frame 12 so as to connect main cavity 44 to the lower corner channels 40 and 42. As shown in FIGS. 1 and 2, the opposite ends of main cavity 44 are covered by a pair of end bells 72 and 74, which carry respective bearing assemblies to support the rotatable shaft 18. Thus, each end bell 72 and 74 covers one opposite end of main cavity 44, except for the four openings provided by the respective cut out portions.

Referring now to FIGS. 2 and 3, cooling air, blown by the cooling fan 62, enters the space provided by top cavity 46 and flows in equal volume over both coilheads 76 and 78 of stator 14. Axial top cavity 46 desirably permits this symmetrical disposition of cooling fan 62 and the resulting flow pattern of cooling air. Cooling air blown into the housing interior is exhausted to the ambient atmosphere through the four openings that are provided by the cut out portions described above.

Figure 4:
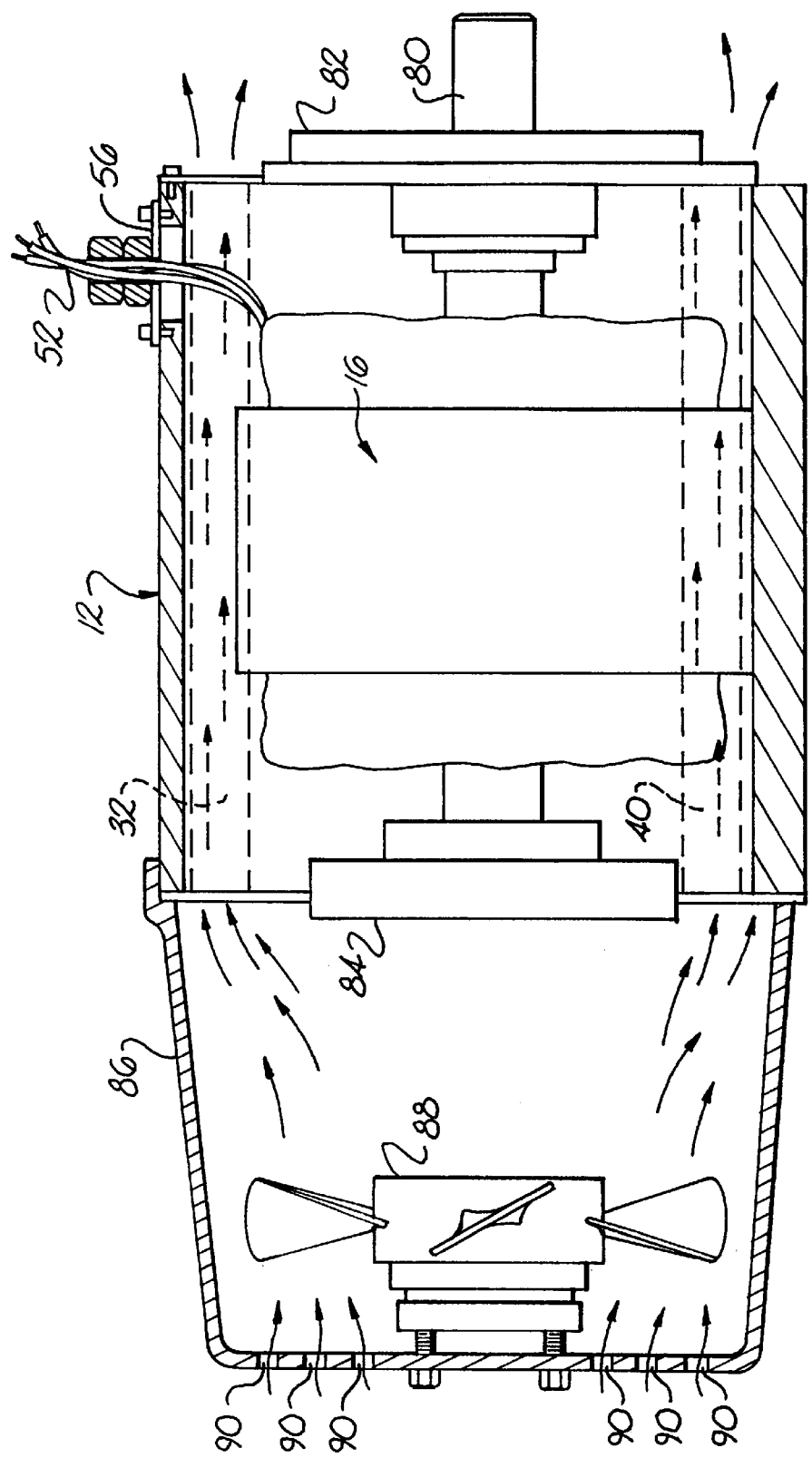
FIG. 4 is a schematic, cross-sectional view taken along a line of sight similar to that indicated by line 2—2 in FIG. 1, but of a motor having a closed housing embodiment.
Figure 5:
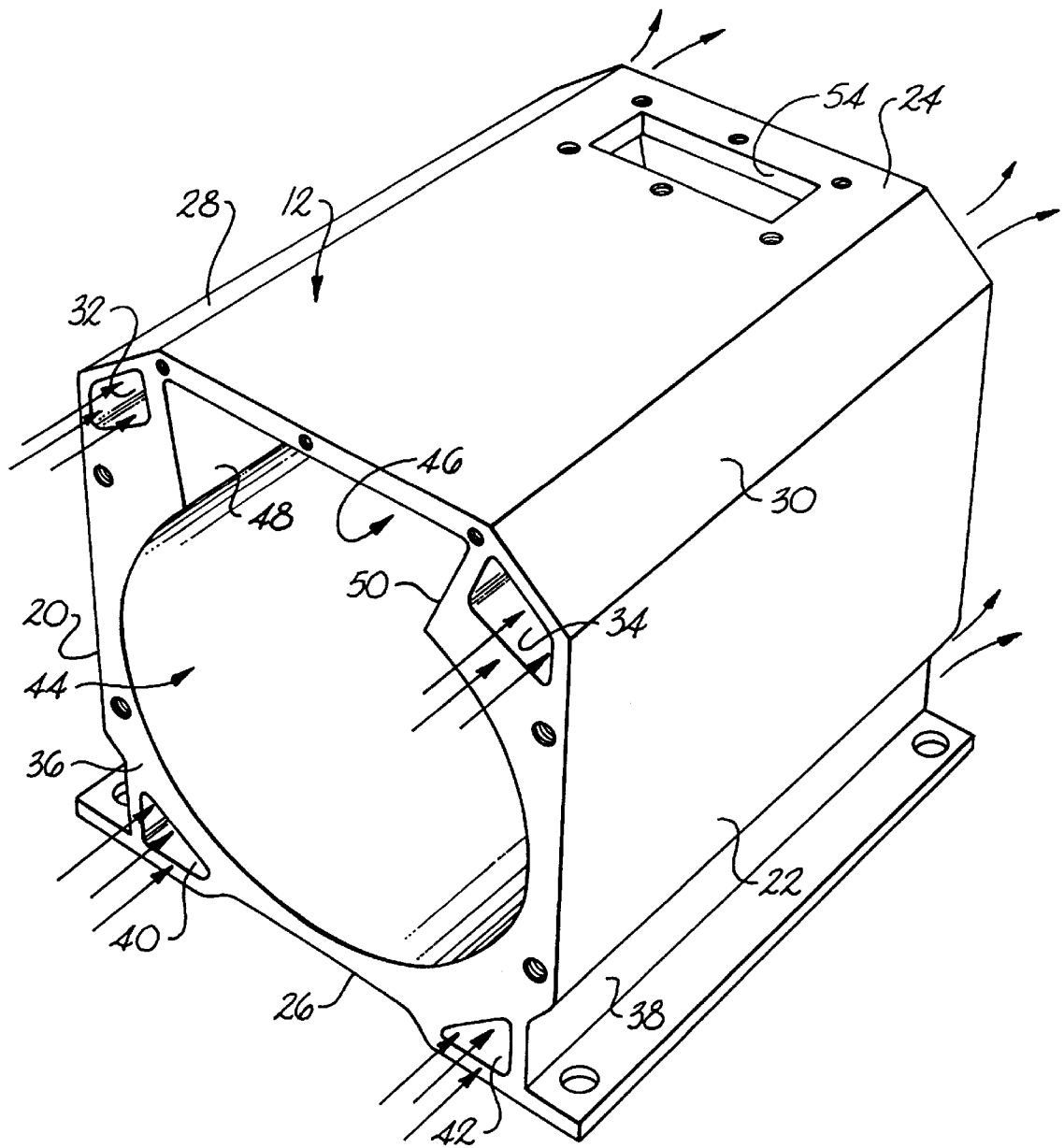
FIG. 5 is a perspective view as in FIG. 3 showing cooling air flow in the closed housing arrangement.

As shown in FIGS. 4 and 5, frame 12 can also be used for a closed housing configuration in which cooling occurs as air (indicated by the arrows) flows through the respective corner channels. In this closed configuration, the motor's shaft 80 extends through front end bell 82, but terminates inside of end bell 84. A cowling 86 is mounted to frame 12 to cover one end of corner channels 32, 34, 40 and 42. A separately-powered blower 88 is mounted inside of cowling 86, operation of which draws ambient air through apertures 90 defined in cowling 86. The ambient air is thus forced into and through the respective corner channels.

In the alternative arrangement shown in FIG. 4A, shaft 80' extends through end bell 84' and terminates inside of cowling 86'. A fan structure 92 is mounted to the end of shaft 80', as shown. Rotation of shaft 80' during operation of the motor forces air though the corner channels in a manner similar to that described above.

Preferably, frame 12 will be maintained in inventory in the form shown in FIG. 5, i.e., without cut out portions such as cut out portions 68 and 70. This form is then used directly in the closed housing arrangement of FIG. 4. Alternatively, frame 12 can be maintained in inventory in the form shown in FIG. 2. In this case, a cover plate can be added to seal fan opening 60 when a closed housing arrangement is constructed. In addition, the cut out portions are preferably filled prior to use in a closed housing arrangement, such as by attaching small metal inserts therein.

Frame 12 is preferably constructed of a durable and heat conductive metal typically used for motor housings, such as cast iron or aluminum. For example, frame 12 can be formed from axially extruded aluminum that is subsequently modified as described above. The same extrusion may thus be advantageously used both for closed housing and open housing cooling arrangements.

It can be seen that the present invention provides an electric motor incorporating a novel frame structure. While preferred embodiments of the invention have been shown and described, modifications and variations may be made thereto by those of ordinary skill in the art without departing from the spirit and scope of the present invention, which is more particularly set forth in the appended claims. For example, the top cavity could take the from of an elongate air cavity defined at various locations along the interior surface of the frame, such as along the sides. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed is:

1. An electric motor comprising:
   a stator having at least one electrical lead extending therefrom;
   a rotor;
   a frame having a generally cylindrical structure defining an interior surface and an exterior surface, said interior surface defining a generally cylindrical main cavity extending axially through said frame, said stator and said rotor being housed in said main cavity;
   said cylindrical structure further including a top wall, and a bottom wall opposite said top wall;
   said cylindrical structure further including a pair of opposed side walls disposed between said top and bottom walls;
   said frame defining a top cavity disposed beneath said top wall and between said top wall and said main cavity such that said main cavity will be in communication with said top cavity;
   at least one axially elongated lower hollow channel defined by said frame;
   at least one cut out portion defined through said main cavity and communicating with a corresponding lower hollow channel;
   a fan opening defined through said top wall and disposed generally centrally along the length thereof; and
   a fan connected to said exterior surface of said cylindrical structure, said fan configured and disposed to draw cooling air from an ambient environment and blow said cooling air through said fan opening and into said top cavity, whereby cooling air will be blown into the interior of said frame and over respective coilheads of said stator.

2. A motor as in claim 1, wherein said at least one electrical lead is disposed in said top cavity and said top wall defines an access opening for providing access to the at least one electrical lead.

3. A motor as in claim 1, wherein said frame further includes a pair of cover plates disposed to cover respective end surfaces of said top cavity.

4. A motor as in claim 1, wherein said at least one axially elongated lower hollow channel comprises a pair of axially elongated lower hollow channels, each said lower hollow channel being disposed at a respective lower corner of said frame.

5. A motor as in claim 1, further comprising a plurality of axially elongated hollow channels extending along said frame.

6. A motor as in claim 5, wherein said plurality of axially elongated hollow channels comprises at least four axially elongated hollow channels respectively located in a corner region of said frame.

* * * * *